MULTIPULSER

Filed May 23, 1966 3 Sheets-Sheet 1

INVENTORS
WILLI HALLER
ROBERT M. GROLL
BY
OSTROLENK, FABER, GERB & SOFFEN
ATTORNEYS

MULTIPULSER

INVENTORS
WILLI HALLER
ROBERT M. GROLL
BY
OSTROLENK, FABER, GERB & SOFFEN
ATTORNEYS

United States Patent Office 3,497,682
Patented Feb. 24, 1970

3,497,682

MULTIPULSER

Willi Haller, Teaneck, N.J., and Robert M. Groll, Pomona, N.Y., assignors, by mesne assignments, to Hecon Corporation, New Shrewsbury, N.J., a corporation of New Jersey Filed May 23, 1966, Ser. No. 552,274
Int. Cl. G06f *7/38;* G06g *7/00*
U.S. Cl. 235—92 15 Claims

ABSTRACT OF THE DISCLOSURE

A simplified rate calculator for accumulating a count in a single counter means having a visual display capable of accumulating a count representative of a number of pulses applied thereto wherein the number of pulses per operation may be different and in any case is representative of the established rate. When applied in the copier machine art, for example, stepping means is provided for coupling a first group of reed switches to the counter input, which reed switches are momentarily closed in sequential fashion to advance the count of the counter. This rate is representative of a first number of copies of a document. The advancing means then couples a second group of reed switches to the counter input different in number from the first group to establish the rate of reproduction for a second quantity of copies. Three or more rates may be provided in a similar fashion. The reed switches are momentarily closed by a rotating permanent magnet member.

Figure 1:
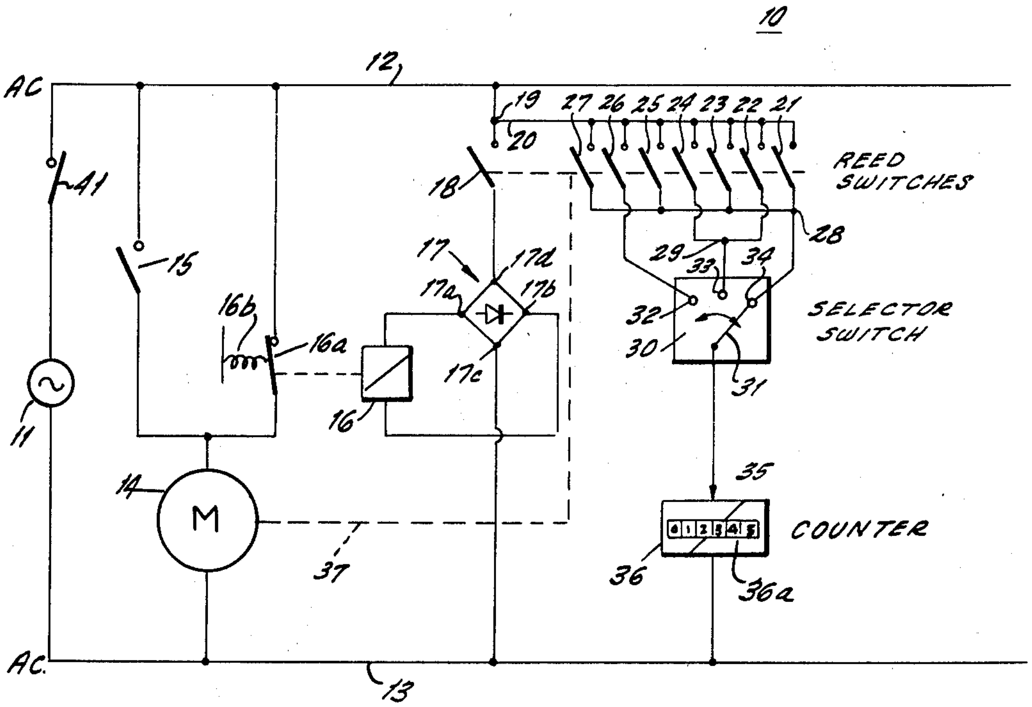

The instant invention relates to programmable computing devices, and more particularly to a novel extremely low-cost computer for automatically calculating and accumulating charges for a multiplicity of similar operations wherein the rate to be charged for the operations being performed differs in accordance with the total number of operations.

Rate computers are well known to present-day technologies. In one typical example of a rate computer, such as is employed in the telephone art, when a routine telephone call is placed, there is normally one rate established for the first three minutes of such a telephone call. If the call being placed extends beyond the three-minute time period, the caller is charged at a rate different from the three-minute rate for each additional minute which elapses beyond the first three minutes. Rather complicated electronic devices have been developed in the past for automaticcally calculating such a rate and generating an output representative of the total cost of the telephone call, including cost for the first three minutes plus charge for subsequent minutes.

Another typical application exists in the document copying field. Many copy or photostat machines are offered to the public on a lease basis. The charge for leasing such a machine is normally a monthly rate, plus the charge for the total number of copies produced during the month in question. One typical established rate may, for example, be a charge of four cents per copy for the first five copies which are made; two cents a copy for the next five copies produced; and one cent per copy for all subsequent copies which are produced.

One approach for obtaining the above mentioned calculations for rates per copy comprises a small-scale electronic programmer. Such a programmer, i.e., computer, clearly has the capability of performing the necessary calculations. However, such small-scale computers are expensive and typical devices employed in copier machines presently in use run as high as $500.00 per unit. Whereas this cost figure can be justified in large size copier machines, the smaller copier machines will not justify such a large expenditure. It, therefore, becomes necessary to provide a device which will perform the necessary rate calculations and be designed to sell at a much lower cost.

One such solution presently in use in copier machines is comprised of a computational device including three or more electromagnetic counters, each of which accumulates the total number of copies run for its particular rate. For example, in the case of three counters, counters A, B and C will provide readings for the four-cent, two-cent and one-cent rates, respectively. Readings are obtained from such counters by an employee of the machine lessor once a month by visually observing the three meters, multiplying them by the proper rate factor, and adding the three calculations to obtain a sum which is charged to the customer leasing such a machine. Whereas this approach yields a computational device which is cheaper than a small-scale electronic computer, a mental calculation is nevertheless required on the part of the machine operator to determine the total cost to the party leasing the computer machine.

It is, therefore, a primary object of the instant invention to provide a novel computational device capable of performing all of the rate calculations in yielding the accumulative total of all rates involved through the use of only a single counter, thereby completely avoiding the necessity of any mathematical steps to be performed by the lessor in order to determine the monthly cost of the machine to the lessee. Whereas the above description relates specifically to copier machines, it should be understood that the device of the instant invention is equally applicable to any application in which differing rate calculations are to be performed.

The instant invention is comprised of a normally deenergized motor, preferably synchronous, which is energized to begin rotation by means of a single momentary pulse which is automatically generated by the copier machine as each copy is being produced. Energization of the motor causes rotation of its motor shaft, thereby rotating a disc or wheel secured to the shaft. The disc is provided with one or more permanent magnet members, which in the case of more than one are, arranged at different angular orientations around the periphery of the disc. The magnetic member(s) may either be embedded into the disc or be secured to one surface thereof.

In one possible embodiment the disc is provided with at least one permanent magnet member which cooperates with a stationary mounted, normally open motor energization and de-energization reed relay. The magnetic field of the permnent magnet member influences the reed relay to maintain it in a closed position so as to close an electrical circuit, preferably supplied with an A-C source. The A-C output is full-wave rectified and applied to a relay means which is energized to maintain an associated normally closed relay contact in an open position. The relay contact is connected in series with the motor means such that with the normally open reed relay closed by the influence of the permanent magnet, the normally closed relay contact is maintained open to keep the motor means deenergized. The momentary pulse which energizes the motor causes the shaft and hence the disc to rotate an amount sufficient to move the reed relay element from the influence of the magnetic field causing the reed relay to open the electrical circuit and de-energize the relay means. This causes the associated relay contact to move to the closed position to thereby maintain the motor energized for one cycle of operation which, as will be further explained, may comprise from a fractional portion of a revolution up to one complete revolution of its shaft.

In a second more simplified embodiment, the disc is again provided with at least one permanent magnet member which cooperates with a single pole double throw reed switch which is in series with the motor means. The double throw reed switch is normally closed but is maintained in an open circuit position when under the influence of the magnetic field of the magnet. Thus with the shaft, disc, and magnet in their starting position, with the magnet maintaining the reed switch in its open circuit condition, the motor means is de-energized.

The momentary pulse which energizes the motor causes the shaft and hence the disc to rotate an amount sufficient to move the single pole reed switch from the influence of the magnet whereby the reed switch return to its closed circuit condition to maintain the motor means energized for one cycle of operation which, as noted above, may comprise from a fractional portion of a revolution up to one complete revolution of its shaft.

It may be noted that the second more simplified system described above is preferably used when the starting current of the motor means is of small enough value so as not to damage the single pole reed switch in series therewith; while the system utilizing the relay and full-wave rectifier would be utilized when the starting current of the motor is too great to place a reed switch in series therewith.

The disc member further cooperates with one or more reed relay members which are arranged in spaced intervals around the periphery of the disc so as to come under the influence of the magnetic field of the permanent magnet member or members secured to the disc. As the motor shaft and disc rotate, the permanent magnet member passes each reed relay element, causing the reed relay elements to be closed in a sequential fashion.

Assuming that the system comprising the relay and full-wave rectifier is being utilized to maintain the motor in its energized state, and further assuming that one cycle of motor operation comprises one full revolution of its shaft; when the disc completes one revolution, the permanent magnet member causes the first motor energization and de-energization reed relay element to again close, energizing the relay coil so as to open the normally closed contact in series with the motor, thereby de-energizing the motor means. The permanent magnet member is of sufficient dimensions to maintain its influence upon the first reed relay after the motor is de-energized so as to maintain the motor circuit in the open circuit condition.

Assuming that the more simplified system (comprising the single pole double throw reed switch in series with the motor) is being utilized to maintain the motor in its energized state, and again assuming that one cycle of motor operation comprises one full revolution of its shaft; when the disc completes one revolution, the permanent magnet member causes the single pole reed switch to open thereby de-energizing the motor.

As has been noted, one cycle of motor operation need not comprise a full revolution of its shaft but may, if desired, only comprise a fractional portion of a revolution. As an example, assume that one cycle of the motor is to comprise only half of a revolution of its shaft. In this case, all of the reed relay members which are to be sequentially closed by the passing permanent magnet member are spaced somewhat closer together and positioned adjacent the circumference of the circle which is circumscribed by the rotating magnet so as to form a semicircular or half-moon configuration. Diametrically opposed from the reed relay which is utilized to maintain the motor in its energized state in the more complicated (relay and full-wave rectifier) system, or diametrically opposed from the single pole double throw reed relay which is utilized in the more simplified system (depending on which system is being used) is another motor energize and de-energize reed relay (or single pole double throw reed relay) which functions in the manner previously described to de-energize the motor when its shaft and disc mounted thereon have rotated 180 degrees.

Placed adjacent the second semicircular portion of the circle circumscribed by the magnet is a second group of reed relay members which is similar in number to the group which occupies the first semicircular position. Similar reed relay members of both groups are electrically connected in common. Thus when the momentary pulse is again supplied by the photocopying machine, the motor is momentarily energized to displace the permanent magnet member from influencing the motor energize and motor de-energize reed relay (or single pole double throw reed relay) such that the motor will remain energized for a second cycle of operation, i.e., a second half revolution of its output shaft.

After passing the second group of reed relay members, the permanent magnet member influences the first motor energize and de-energize reed switch (or single pole double throw reed relay) once again and the motor will be de-energized in the manner described previously.

It is apparent that the above described system which utilizes half revolution cycles, effectively doubles the life of the reed relay members which are sequentially energized (i.e., they are closed only once for every two cycles of operation) but at the same time requires a duplication of reed relays. It should be further apparent that rather than utilizing cycles of half revolution duration, the above principles could be applied to a system utilizing one-third, one-quarter, etc. revolutions of the magnet for each complete cycle of operation, in which case the number of reed relay systems would be tripled, quadrupled, etc.

In any event, each of the sequentially energized reed relays (either of the single group for a full revolution cycle or the common points of the reed relays of the fractional revolution cycle) are selectively coupled through a selector switch means to the input of an electromagnetic counter. At the time that any given reed relay is electrically coupled to the electromagnetic counter means and comes under the influence of the permanent magnet member, the counter is pulsed so as to be advanced by one count.

The selector switch is preferably a stepping switch having a number of positions at least equal to the number of rates necessary, plus the number of copies to be made at each rate. As one example, the same pulse which is applied to momentarily energize the synchronous meter may be employed to activate the stepping switch and thereby advance the stepping switch arm to each succeeding terminal as each copy is produced by the copier machine. As one example, let it be assumed that the first five copies are charged a first rate; the second five copies are charged a second rate; and all additional copies are charged a third rate. As the first copy is run off, a rotary switch is in position 1. The first five positions are connected in common to a first plurality of reed relay means. The second five terminals of the stepping switch are connected in common to a second plurality of reed relay means, fewer in number than the first plurality. The next terminal of the stepping switch is connected in common to a third plurality of reed relay means, fewer in number than both the first and second pluralities. As the first copy is produced, the stepping switch steps to the next contact. The first five contact positions cause a first plurality of pulses to advance the counter means. As the fifth copy is produced, the stepping switch steps to contact position 6, causing the second plurality of reed relay means to pulse the electromagnetic counter. As the tenth copy is run off, the stepping switch advances to the eleventh contact position, causing the third plurality of pulses to be coupled to the electromagnetic counter for each copy thereafter run off. The stepping switch is preferably provided with a slip clutch means so as to maintain its rotary arm in contact with the eleventh contact position for every copy run off after the eleventh copy. As the machine is shut off, a reset pulse energizes a relay means to reset the stepping switch back to the first contact position.

As an alternative embodiment, the synchronous motor shaft may be provided with a plurality of discs keyed to the shaft wherein one disc is provided for each rate to be calculated. Each disc has at least one reed relay means positioned adjacent the periphery of the disc as well as a differing plurality of permanent magnet members secured to the discs near the periphery thereof for the purpose of influencing the reed relay members. At least one of the plurality of discs is provided with one (or more) additional reed relay means for the purpose of maintaining the energization of the motor throughout one cycle of operation in the same manner as was previously described. The discs are spaced apart by at least a distance sufficient to prevent the reed relay means associated with one disc from being influenced by the magnetic field of a permanent magnet secured to a neighboring disc. Whereas the permanent magnet members are described as being secured to a disc, it should be understood that the permanent magnet members may be secured to individual rods or arms arranged as spokes about the shaft, or may be arranged about a flat plate having any desired polygonal periphery such as a triangular, square, hexagonal, octagonal, and so forth, configuration. If desired, the permanent magnet members may be arranged so as to be removably secured to the discs, spokes, or other rotating plates for purposes of altering the rates, if so desired. In the second alternative embodiment, it may also be possible to add additional rates simply by ganging additional discs to the synchronous motor shaft.

It is, therefore, one object of the instant invention to provide a novel computational device for producing a reading in a single counter means of a plurality of identical activities and the groups of which are charged at diffent rates.

Another object of the instant invention is to provide a novel computational device for providing a total reading in a single counter means for a multiplicity of identical operations which are to be counted by means of driving a motor through one cycle of operation for the purpose of causing at least one permanent magnet member to pass by and activate a plurality of reed relay means to advance the count of the electromagnetic counter.

Yet another object of the instant invention is to provide a novel computational device for providing a total reading in a single counter means for a multiplicity of identical operations which are to be counted by means of driving a motor through one cycle of operation for the purpose of causing at least one permanent magnet member to pass by and activate a plurality of reed relay means to advance the count of the electromagnetic counter, and further comprising selector switch means for coupling differing reed relays to the electromagnetic counter means for differing rates to be charged so as to accumulate a single reading in the counter means reflecting the total cost of the multiplicity of activities which have been performed.

Figure 2:
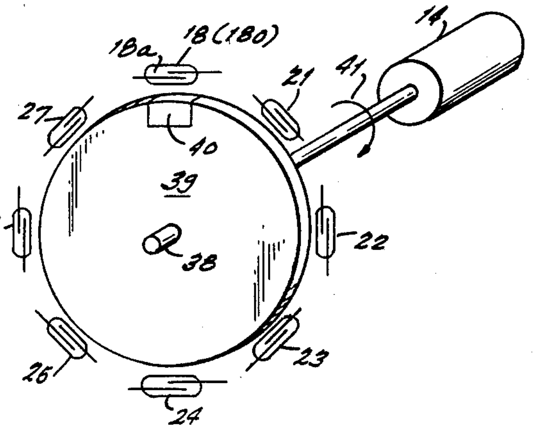
Figure 4:
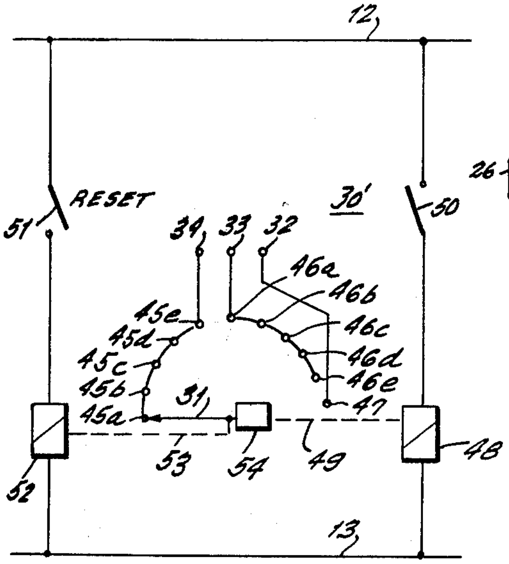
Figure 1A:
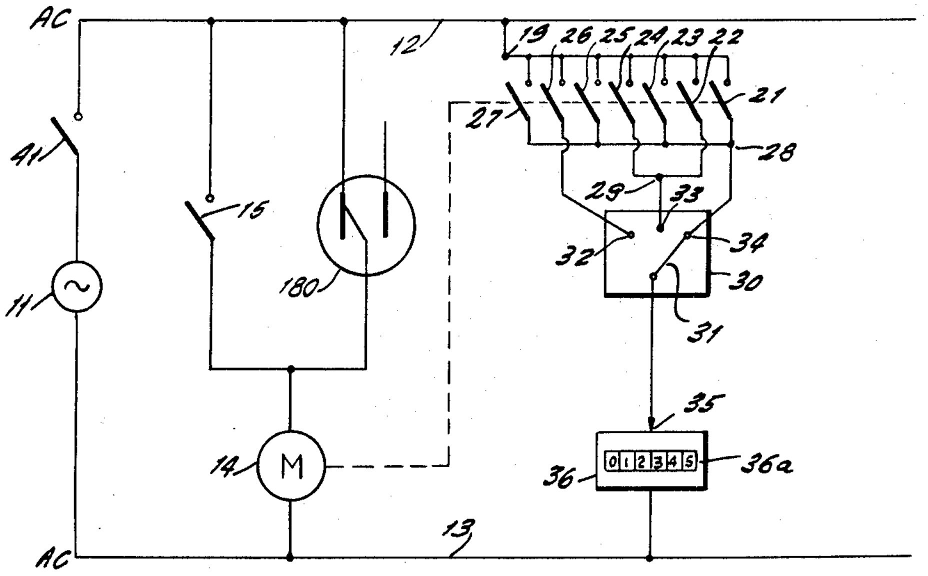
Figure 2A:
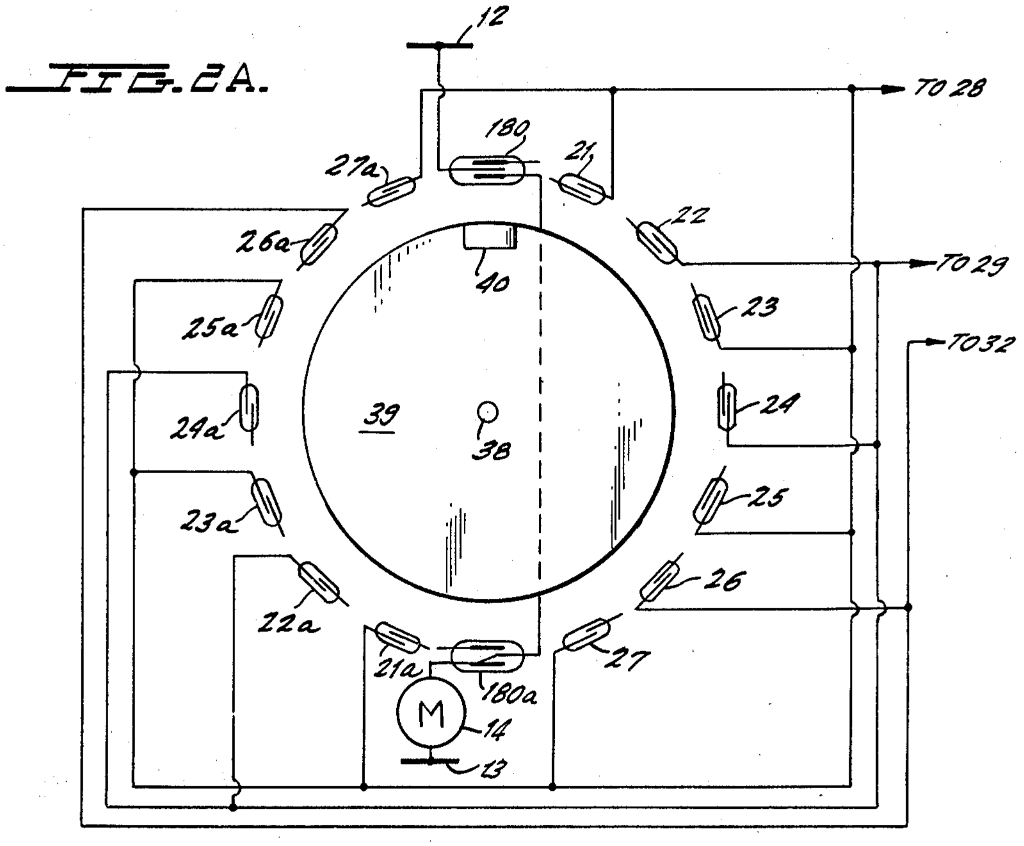
Figure 5:
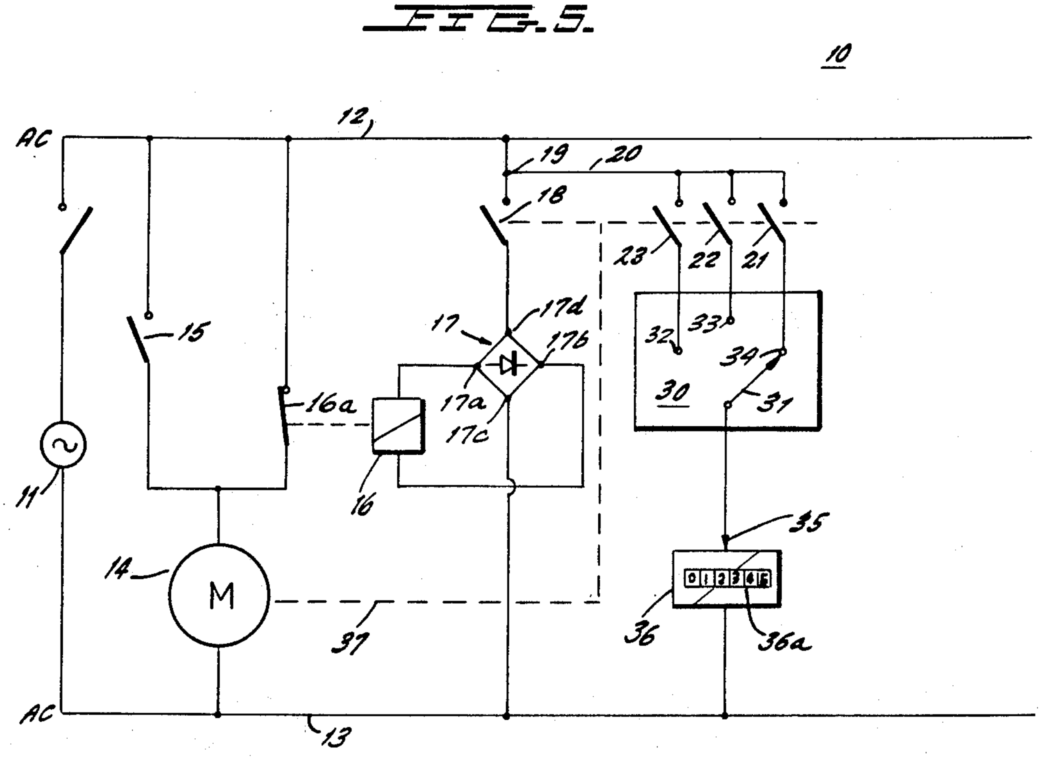
Figure 3:
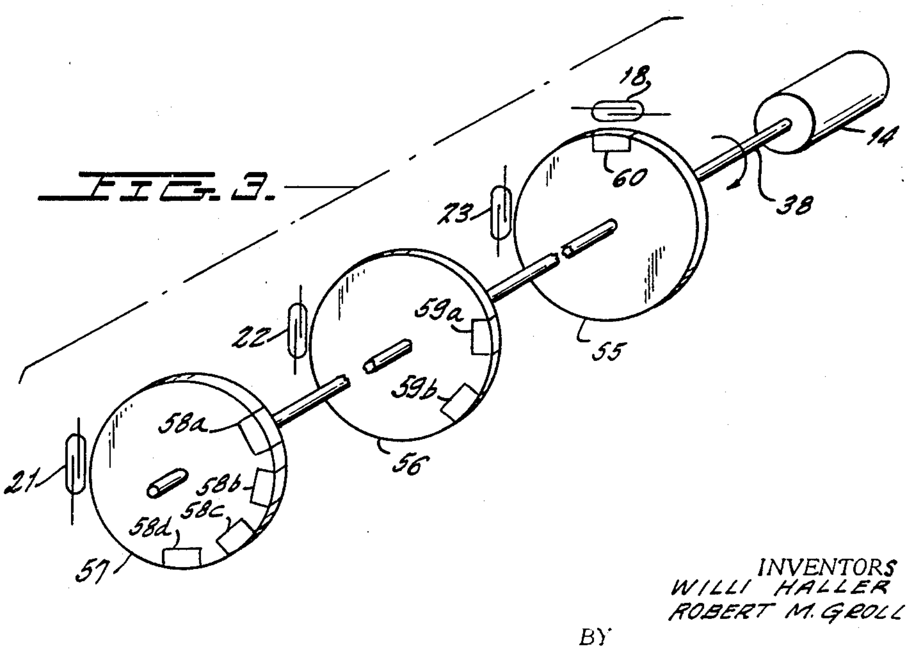

These and other objects of the instant invention will become apparent when reading the accompanying description and drawings, in which:

FIGURE 1 is a schematic diagram of a multiple rate computational device designed in accordance with the principles of the instant invention;

FIGURE 1*a* and 5 are schematic diagrams of alternative embodiments of a multiple rate computational device designed in accordance with the principles of the instant invention;

FIGURE 2 is a perspective view showing the reed relay means, permanent magnetic member and motor means employed in the system of FIGURE 1;

FIGURE 2*a* is a showing of the reed relay means, the magnet, and the motor shaft of an alternative embodiment of the instant invention;

FIGURE 3 is a perspective view showing an alternative embodiment for the reed relay means and permanent magnet means of FIGURE 2; and FIGURE 4 is a schematic diagram showing the selection switch of FIGURE 1 in greater detail.

The multiple rate computational device 10, shown in FIGURE 1, is comprised of an A-C source 11 coupled to a pair of buses 12 and 13. A synchronous motor 14 has a first terminal thereof electrically coupled to bus 13 and a second terminal electrically coupled to a normally open switch contact 15 and a second normally closed contact **16*a* operated by its associated relay coil 16 in a manner to be fully described. Both sets of contacts 15 and 16*a* have their opposite ends electrically coupled to bus 12**.

The relay coil 16 has its opposite terminals electrically coupled to the output terminals **17*a* and 17*b* of a full-wave rectifier 17 comprised of four arms each having a diode member. The input terminal 17*c* is electrically coupled to bus 13. The remaining input terminal 17*d* is electrically coupled through a reed relay switch 18 to common bus 12**.

A common terminal 19 electrically connects bus 12 to a third common bus 20 which is connected in common to one terminal of a plurality of reed switches 21 through 27. The opposite terminals of reed switches 21, 23, 25 and 27 are all connected in common to terminal 28. The opposite terminals of reed switches 22 and 24 are connected in common to terminal 29. A selector switch 30, shown in simplified fashion and operating in a manner to be more fully described, is provided with a rotary arm 31 arranged to be stepped between three contact positions 32 through 34, respectively, so as to electrically couple rotary arm 31 to the opposite terminal of reed switch 26, the common terminal 29, and the common terminal 28, respectively.

The opposite end of rotary arm 31 is electrically coupled to the input terminal 35 of an electromagnetic counter 36. The other input terminal of counter 36 is coupled to common bus 13.

The rotation of motor 14 selectively closes reed switches 18 and 21 through 27 with the coupling influence therebetween being represented by the dotted line 37.

FIGURE 2 shows the physical manner in which the reed switches are selectively operated by synchronous motor 14. As shown in FIGURE 2, synchronous motor 14 is provided with an output shaft 38 which has secured thereto a disc-shaped member 39. A permanent magnet member 40 is embedded into disc member 39 along its periphery. The reed switches 18 and 21 through 27 are arranged so as to be at spaced angular intervals around disc 39 and in close proximity to its periphery. Having described the elements of the multiple rate computational device, the operation of the device will now be presented:

Energization of the machine by means of depressing a start pushbutton closes switch means 41 to couple A-C source 11 to common buses 12 and 13. Let it be assumed that the computational device of FIGURES 1 and 2 is being employed in a copier machine. Therefore, as the first copy is being produced, the machine generates a pulse, operates a relay, or performs any other suitable operation so as to momentarily close the normally open switch means 15. This causes momentary energization of synchronous motor 14. Just prior to closure of normally open contact switch 15, disc 39 is in the reset position, as is shown in FIGURE 2. In this position permanent magnet member 40 influences reed switch 18 causing it to close.

In the consideration of FIGURE 1, closure of reed switch 18 energizes relay coil 16 through the full-wave rectifier circuit 17, causing the normally closed relay contact 16*a* to be in the open position so that synchronous motor 14 remains in the de-energized state. Upon the occurrence of the machine output pulse to indicate that the first copy is being produced, synchronous motor 14 is momentarily energized, causing its shaft 38 to rotate clockwise, as shown by arrow 41. This causes reed switch 18 to be removed from the influence of permanent magnet member 40, thereby causing reed switch 18 to move to the open position, as shown in FIGURE 1. With reed switch 18 now open, relay coil 16 is de-energized, causing its switch contact 16*a* to move to the normally closed position under the influence of suitable bias means 16*b*.

With the closure of relay contact switch 16*a*, motor means 14 remains energized, causing its shaft 38 and disc 39 to rotate through one cycle of operation before coming to rest, in a manner to be more full described.

As the revolution of shaft 38 and hence disc 39 begins, and assuming that the first machine copy is being produced or first other identical operation is being performed) the selector switch rotary arm 31 will be in the solid line position shown in FIGURE 1, making electrical engagement with contact position 34. In this, it can clearly be seen that input terminal 35 of electromagnetic counter 36 is electrically connected in common through rotary arm 31, contact 34 and terminal 28 to reed switches 21, 23, 25 and 27. At this time the above mentioned reed switches are all in the open position. With a cycle of operation equal to one revolution of shaft 38 the rotation of disc 39 causes the permanent magnet member 40 to pass by all of the reed switches 21 through 27. As it leaves the start position, motor energization and de-energization reed switch 18 is positioned as shown in FIGURE 2. As the permanent magnet member 40 passes each reed switch, the reed switch whose normal position is such that is cooperating contacts are normally disengaged, moves to the engaged position under the influence of the magnetic field established by the permanent magnet member so as to establish a completed current path from common bus 12 through terminal 19, common bus 20, to the particular reed switch in question, to one of the contact positions 32, 33, 34 and rotary switch 31 to the input 35 of counter 36. The selector switch 30 controls the number of reed switches connected to the counter 36 through any revolution.

Returning to the assumption that the rotary switch arm 31 makes engagement with contact 34, only the closure of reed switches 21, 23, 25 and 27 establish a current path from common bus 12 to the input of counter 36 throughout one revolution. Although reed switches 22, 24 and 26 will be momentarily closed by the permanent magnet member 40, they will have no effect upon the counter 36. All of the reed switches 18 and 21 through 27 may be of any suitable conventional type which are normally comprised of a pair of elongated resilient contacts, vacuum sealed within a suitable envelope (18*a* for example) and protruding beyond the ends of the envelope for connection to an electrical circuit. The contacts are so positioned as to be normally disengaged and adapted for becoming engaged under the influence of a magnetic field. As the magnetic field caused by the permanent magnet member 40 influences reed switches 21, 23, 25 and 27 throughout almost a complete single revolution the momentary current path provides a "pulse" to the inputs of counter 36 causing it to advance its count by one.

Counter 36 may be any suitable electromagnetic counter capable of being advanced by an electrical pulse and having a visually observable count as shown beneath a window 36*a*. The count may be of any suitable number of digits, the example shown in FIGURE 1 being a six-digit counter having a reading at the particular moment of 012345.

As disc 39 nears the completion of one revolution, permanent magnet member 40 again returns to the position shown in FIGURE 2, moving contacts of reed switch 18 to the engaged position. This causes a full-wave rectified, or D-C signal to energize relay coil 16 and pull its associated relay contacts 16*a* out of engagement so as to de-energize motor 14. The permanent magnet member 40 is of a sufficient width or dimension so as to maintain reed switch 18 closed during the time in which it takes the relay contact 16*a* to open, to become de-energized and to decelerate to the stop position.

As an alternative embodiment, it is apparent that two magnets 40 could be located on disc 39 so that the number of reed relay members could be cut in half. Similarly, if the number of magnets were increased by a factor X, the number of reed relay members could be reduced by a factor of X.

Considering the copier machine application, let it be assumed that the first five copies prepared are to be charged at a rate of 4¢ per copy. As each copy is being prepared, the contact switch 15 will be momentarily closed during each time period in which a copy is being prepared. Since the first five copies are to be charged at an identical rate, the selector switch arm 31 will be maintained in electrical contact with contact position 34 during the time that the first five copies are produced. This means that each of the first five revolutions will cause the counter 36 to be pulsed four times per revolution, or a total of twenty times, or counts.

As the fifth copy is being produced, the selector switch 30 is operated so as to cause its rotary arm 31 to move into engagement with contact position 33. This places only reed switches 22 and 24 into contact with rotary arm 31. Thus, during the time in which each copy being prepared after the fifth copy occurs, the revolution of the motor shaft and discs 38 and 39, respectively, could be closures of reed switches 22 and 24 to the input of counter 36 causing the counter to be pulsed twice per revolution. Assuming that the rate for the next five copies is to be 2¢ per copy, this operation will continue from the sixth through the tenth copy. After the tenth copy is produced, the selector switch arm 31 will move into electrical engagement with contact position 32, coupling only reed switch 26 to the input of counter 36. Thus, all revolutions of disc 39 subsequent to the tenth revolution will cause only the closure of reed switch 26 to provide counter 36 with a pulse. It can clearly be seen that no matter how many copies are run off, the total cumulative count appears in the window 36*a* of the counter, thereby providing not only rate calculation, but a total cumulative count in a single counter means. The stoppage of the motor each time is due to the cooperation between the permanent magnet 40 and reed switch 18, in the same manner as was previously described.

One selector switch which may be employed is the switch 30′ shown in FIGURE 4. The selector switch 30′ of FIGURE 4 is comprised of rotary arm 31 and eleven contact positions 45*a*–45*e*, 46*a*–46*e* and 47, respectively. Each time a copy is produced the machine develops a pulse or other suitable signal capable of closing contact switch 50. This energizes relay coil 48 which is coupled to rotary arm 31 by the linkage designated by dotted line 49, causing the arm to advance one position each time the relay coil is energized. Assuming the application given above, the first five copies cause the rotary arm 31 to move between contact positions 45*a*–45*e*. Each of these contact positions are connected in electrical common to terminal 34 which couples reed switches 21, 23, 25 and 27 to counter 36 during each of the first five revolutions.

At the sixth revolution energization of relay coil 48 moves rotary switch 31 into electrical engagement with contact position 46*a* coupling terminal 33 to reed switches 22 and 24, thus providing two input pulses per revolution to counter 36. This arrangement will be maintained during the production of the sixth through the tenth copy due to the fact that contact positions 46*a*–46*e* are electrically connected in common.

At the production of the eleventh copy relay coil 48 places rotary arm 31 in electrical engagement with contact position 47 connecting terminal 32 to single reed switch 26 causing only one pulse per revolution to be applied to the input of electromagnetic counter 36. The selector switch 30' is preferably provided with a slip clutch 54 which operates so as to prevent rotary arm 31 from moving beyond contact position 47 so that each copy beyond the eleventh copy maintains the rotary arm in electrical engagement with contact position 47. This position will be maintained regardless of the number of copies which are produced and until the machine is shut off.

When the machine is either automatically shut off or manually shut off, a pulse or other suitable output is produced capable of closing contact switch 51 to energize relay coil 52. This reset operation is mechanically linked to rotary arm 31 through the dotted line representation 53 moving rotary switch 31 back to the initial contact position **45*a*** in readiness for subsequent operations. It should be understood that the FIGURE 4 shows only one possible selector switch arrangement and any other suitable means may be employed for this purpose.

As noted previously, the motor energization and deenergization system including the reed relay 18, the fullwave rectifier 17, the relay coil 16, and the relay contacts **16*a* of FIGURE 1 are primarily used when the starting current associated with the motor 14 is too high to permit the use of a reed relay in series therewith. However, when the starting current associated with the motor 14 is sufficiently low, it is possible to utilize a reed relay directly in series with the motor 14** to more simply perform the operations previously performed by the rectifier, relay coil, etc., of FIGURE 1. Such an alternative embodiment is shown in FIGURE 1*a*.

Referring to FIGURE 1*a*, like numbers have been utilized to designate like parts, and since the overall operation of FIGURE 1*a* is similar to that described with respect to FIGURE 1, only the motor energization and deenergization system will be described in greater detail. Connected in series with one terminal of motor 14 is a single pole double throw reed relay member 180 which, in the absence of a magnetic field, occupies the normally closed position shown in FIGURE 1*a*. However, when the magnet member 40 of disc 39 is positioned as shown in FIGURE 2, the magnet 40 influences reed relay 180 so as to open the circuit therethrough. Thus in the starting position, relay 180 is open and the motor is deenergized (note that one of the contacts of relay 180 is not used).

When the momentary pulse of the copying machine closes contact 15, motor 14 is momentarily energized to move the permanent magnet 40 away from relay 180 such that reed relay 180 may revert to its normally closed circuit condition to maintain the motor in its energized state throughout one cycle of operation.

As was also previously noted, one complete cycle of operation may comprise a full revolution of shaft 38 of motor 14 (as is the case for the embodiment shown in FIGURES 1 and 1*a*) or may comprise a fractional portion of one revolution of the shaft 38. Such an alternative embodiment is illustrated in FIGURE 2*a* for the case where one cycle of operation comprises a half revolution of shaft 38.

In FIGURE 2*a*, reed relay 180 is located in the same position as that indicated in FIGURE 2 (at this point it should be noted that either reed relay 180 or reed relay 18 might be utilized in the embodiment of FIGURE 2*a*, depending upon whether the system of FIGURE 1*a* or 1 is being utilized. Although in no way intended to be limited to such disclosure, for ease of explanation, the remainder of this discussion of FIGURE 2*a* will refer to reed relay 180 rather than "180" or "18"). The reed relays 21–27 are spaced somewhat closer than they were in FIGURE 2, and in this embodiment occupy a semicylindrical configuration adjacent the disc 39 (or the semi-circle circumscribed by magnet 40 in the event that magnet 40 is merely on a spoke attached on the shaft 38). Diametrically opposed from the first reed relay 180 is a second reed relay **180*a* which functions in a manner similar to the first reed relay 180**, as will be further described.

A second group of reed relays **21*a*–27*a* are similarly located in a semicircular configuration opposite the first group of reed relays 21–27. Similarly numbered reed relays of each group, i.e., 21, 21*a*; 22, 22*a*; etc. are connected in common and pass to junctions 28, 29 and 32 in the manner and for the purpose previously explained with respect to reed relays 21–27** in FIGURE 1.

The operation of the embodiment of FIGURE 2*a* is set forth below. Assuming the system reset, the permanent magnet 40 addresses the reed relay 180 thereby maintaining it open. It is to be noted that reed realy **180*a* is in electrical series with reed relay 180; is similar in operation to reed relay 180. The momentary pulse generated by the copying machine closes contact 15** in FIGURE 1*a* to momentarily energize motor 14 and move magnet 40 away from the reed relay 180 so that the motor remains energised for a cycle of operation, which in this case will be a half revolution. Note that reed relay **180*a* is closed during this time. During the half revolution reed relays 21, 23, 25 and 27; or reed relays 22, 24, or reed relay 26 will be sequentially closed to advance the counter 36, depending upon the position of arm 31 of the selector switch 30**.

When the magnet 40 approaches reed relay **180*a*** the magnetic field opens such reed relay to once more deenergize the motor, thereby completing the cycle of operation.

A second momentary pulse will close switch 15 thereby initiating a second cycle of operation exactly the same as the first cycle, the only exception being that reed relays **21*a*–27*a* will be sequentially closed to pass the proper information onto the counter 36**.

It is apparent that the embodiment of FIGURE 2*a* doubles the life of all the reed relays in that they will each be energized only once for every two cycles of operation. It should be apparent that the principle employed above may be extended to embodiments wherein the cycle of operation would be one-third, one-quarter, etc. portion of a revolution which, of course, would require a similarly factored number of relay groups.

FIGURE 3 shows an alternative arrangement for the disc, permanent magnet and reed switch configuration of FIGURE 2. The modified electrical circuit is shown in FIGURE 5. In the embodiment of FIGURES 3 and 5 only four reed switches are employed while three disc members and additional permanent magnet members are employed in this embodiment. The motor shaft 38 of FIGURE 3 is provided with three discs 55–57 ganged to the shaft. Disc 57 is provided with four permanent magnet members **58*a*–58*d*, disc 56 is provided with two permanent magnet members 59*a* and 59*b*, and disc 55 is provided with one permanent magnet member 60**. The operation of the alternative embodiment is as follows:

The closure of contact switch 15 momentarily energizes synchronous motor 14, revolves shaft 38 and discs 55–57. Assuming selector switch 30 to be in the solid line position as shown in FIGURE 5, only reed switch 21 will be coupled to counter 36. Each switch 21 experiences four closures during one revolution of shaft 38 and hence disc 57 causing counter 36 to be pulsed four times. At the completion of one revolution permanent magnet member 60 on disc 55 causes reed switch 18 to close and hence deenergize motor 14 in the same manner as was previously described with reference to the embodiments of FIGURES 1 and 2.

After five copies have been produced, selector switch rotary arm 31 moves into electrical engagement with contact position 33, coupling reed switch 22 to electromagnetic counter 36. The two permanent magnets 59*a* and 59*b* of disc 56 cause reed switch 22 to make two closures during a single revolution closing the counter 36 twice per revoultion.

After the tenth copy has been produced rotary arm 31 will be stepped to make electrical engagement with contact position 32 coupling reed switch 23 to the input of counter 36. During each revolution the closure of reed switch 23, under control of permanent magnet 60, causes one pulse per revolution to couple to counter 36.

Therefore, the embodiment of FIGURES 3 and 5 provides substantially identical operation to the embodiment of FIGURES 1 and 2 requiring four less reed switches by substituting the reed switches with two additional discs and six additional permanent magnet members. The rate per copy may be altered by removably securing fewer or greater permanent magnet members to each of the discs desired. An additional feature of the embodiment of FIGURE 3 enables more rates to be provided for simply by adding an additional disc for each additional rate to be charged and providing the disc with a suitable number of permanent magnet members representing the rate to be charged for controlling closure of its associated reed switch. As was previously described, the permanent magnets need not be secured to a disc member but may be secured to any other suitable flat member of polygonal periphery or may be secured to rods pending from shaft 38 in the same manner as spokes from a wheel or to any other suitable support means capable of being rotated by shaft 38. As another alternative, the reed switches 18 and 21–27 in the embodiment of FIGURE 2 may be mounted for rotation upon suitable support being rotated by shaft 38 with the permanent magnet member 40 being held stationary. Since the reed switches require electrical wiring to the circuit of FIGURE 1, the platform or other suitable means upon which they rotate may be provided with a wiping contact arrangement to permit the reed switches to be rotated without having their electrical wiring continually being rotated and twisted. In a like manner the permanent magnets in the embodiment of FIGURE 3 may also be held in this stationary position and the reed switches may be rotated relative thereto.

It can be seen from the foregoing that the instant invention provides a novel electromechanical means for automatically calculating the rates per operation of the multiplicity of operations which are to be charged at a differing rate per group of operations and for providing the total amount to be charged to the user in a single counter means by greatly expediting the reading of such an output. If desired, in addition to the visually observable output, analog-to-digital converter means may be coupled to the electromagnetic counter for reading directly into a communications link or into a local memory means for readout at any future time.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Means for calculating the charges for a multiplicity of substantially similar operations wherein the certain groups of operations are charged at different rates comprising:

a power source;
motor means;
means for momentarily coupling said motor through a first electrical path to said power source during the performance of an operation;
said motor means having an output shaft;
magnetic means coupled to said shaft for rotation therewith;
a plurality of first reed switches coupled to said power source positioned at spaced intervals along an imaginary arc close to the path of rotation of said magnetic means so as to be closed when magnetically influenced by said magnetic means;
an electromagnetic counter having an input;
selector means for coupling different groups of said first reed switches to said input for respectively different rates to be charged, the quantity of reed relays in each group connected to said counter being different from the quantity in every other group.

2. The calculating means of claim 1 further comprising:

a second reed switch positioned adjacent said path of rotation, said second reed switch decoupling said motor means through a second path coupled to said power source in the absence of said momentary energization of said motor means, said second reed switch being operated to couple said motor means through said second path to said power source in response to said magnetic means being moved away from said second reed switch in response to said momentary energization of said motor means to maintain said motor means energized for one cycle of operation.

3. The calculating means of claim 2 further comprising:

a third reed switch positioned adjacent said path of rotation and connected in said second path, said third reed switch normally occupying a closed circuit position, said third reed switch being activated to an open circuit position in response to said magnetic member being moved in influencing relationship therewith; and
a second plurality of first reed switches coupled to said power source at spaced intervals along said imaginary line so as to be closed when magnetically influenced by said magnetic means,
whereby said one cycle of operation may comprise less than one full revolution of said output shaft.

4. The calculating means of claim 1 further comprising:

a second reed switch positioned adjacent said path of rotation and coupled to said power source;
switch means decoupling said motor means through a second path;
said switch means including a relay coil electrically connected to said second reed switch for maintaining said motor means energized for one cycle of operation of its shaft when said momentary energization of said motor means moves said magnetic means away from said second reed switch.

5. The calculating means of claim 4 further comprising:

a third reed switch positioned adjacent said path of rotation and coupled to said power source;
second switch means decoupling said motor means through a second path;
said second switch means including a relay coil electrically connected to said third reed switch for maintaining said motor means energized for one cycle of operation of its shaft whenever momentary energization of said motor means moves said magnetic means away from said third reed switch; and
a second plurality of first reed switches coupled to said power source at spaced intervals along said imaginary line so as to be closed when magnetically influenced by said magnetic means;
whereby said one cycle of operation may comprise less than one full revolution of said output shaft.

6. The calculating means of claim 1 wherein said magnetic means is comprised of a permanent magnet member; means securing said permanent magnet member to rotate through a circular path upon rotation of said motor shaft for selectively closing said reed switches.

7. The calculating means of claim 1 wherein one terminal of said reed switches is connected to said power source;

said selector means being a switch having a switch arm movably engageable with a plurality of contacts;

each of said contacts being coupled to the opposite terminals of a different plurality of reed switches for each of said different rates;

said switch arm connecting one of said contacts to said counter input for at least one rotation of said motor shaft.

8. The calculating device of claim 1 wherein said magnetic means comprises:

a plurality of groups of permanent magnet members, each group including at least one permanent magnet member;

the members of each group being arranged substantially in a plane and being coupled to said shaft for rotation therewith;

each of said planes being arranged at spaced intervals along said shaft;

at least one reed switch being provided for each of said groups and being arranged in the manner described in claim 1.

9. The calculating means of claim 1 wherein said selector means further comprises:

a plurality of contacts;

a switch arm selectively engageable with said contacts;

relay means energized by said power source during the performance of an operation for advancing said by said switch arm.

each of said contacts coupling a predetermined number of reed switches to said counter input when engaged said by switch arm.

10. The calculating means of claim 9 further comprising means for resetting said selector means after completion of said multiplicity of operations.

11. A device for calculating charges for a multiplicity of operations wherein succeeding groups of said operations are charged at differing rates, comprising:

a power source;

motor means having an output shaft;

means momentarily coupling said motor means to said power source through a first path each time an operation is being performed;

a plurality of reed switches each having a first terminal connected to said power source, said reed switches being arranged in circular fashion about said shaft;

electromagnet counter means having a first input terminal connected to said power source and a second input terminal;

selector means including stepping means advanced for each of said operations to couple a first group of said reed switches to the second input terminal of said electromagnet counter means, said selector means including means for coupling a second group of reed switches to said second input terminal after being advanced a predetermined number of times, whereby the quantity of reed switches connected to said second input terminal is different for each group;

a magnet;

means coupling said magnet to said shaft for moving said magnet by said reed switches to selectively control the operation of said reed switches;

reed switch means responsive to the influence of said magnet for selectively opening and closing a second path to which said motor means is connected, said reed switch means maintaining said second path open when under the influence of said magnet, said reed switch means permitting said second circuit path to close once said magnet is moved out of influencing relationship therewith in response to movement of said shaft caused by the momentary coupling of said motor means to said power source through said first path, said reed switch means causing the reopening of said second path to deenergize said motor means in response to said magnet moving back into influencing relationship thereto at the completion of one cycle of operation of said device.

12. The device of claim 11 wherein said reed switch means comprises a normally closed reed switch located adjacent an imaginary line circumscribed by said magnet, said normally closed reed switch being connected in series with said second path.

13. The device of claim 11 wherein said reed switch means comprises:

a normally open reed switch located adjacent an imaginary line circumscribed by said magnet;

a relay coil connected to said normally open reed switch said coil being energized in response to the closing of said normally open reed switch; and normally closed contact means in series with said second path, said normally closed contact moving to an open circuit condition in response to energization of said relay coil caused by the closing of said normally open reed switch when under the influence of said magnet.

14. Calculating means for accumulating different pulse rates comprising:

single counter means capable of accumulating a plurality of counts representative of the number of discrete pulses supplied to the input of said counter;

a rotatable member;

means for rotating said member;

an energy source;

first means for momentarily coupling said energy source to said rotating means;

stepping means;

a plurality of normally open reed switches positioned at spaced intervals about said rotatable member and coupled between said source and said stepping means;

said rotatable member having activating means for sequentially closing said reed switches when said rotatable member is rotated;

means for maintaining the electrical connection between said energy source and said rotating means for a period sufficient to cause said activating member to sequentially and momentarily close all of said reed switches after closure of said first means;

said stepping means being advanced each time said first means is operated for selectively coupling different combinations of said reed relays to said counter input to apply a different number of pulses to said counter at specified positions of said stepping means.

15. Calculating means for accumulating different pulse rates comprising:

single counter means capable of accumulating and displaying a count representative of the number of pulses applied to the input of said counter;

a power source;

a plurality of normally open reed switches arranged at spaced intervals, each being coupled to said power source;

first means for momentarily closing all of said reed switches in sequential fashion during its operating cycle;

second means for operating said first means to perform a pre-selected number of cycles;

stepping means advanced in stepwise fashion for each operating cycle of said first means;

said stepping means respectively including:

third means for connecting a first selected group of said reed switches to said counter input during a first predetermined number of operating cycles of said first means;

fourth means for connecting a second selected group of said reed switches to said counter input during a second predetermined number of operating cycles of said first means;

fifth means for connecting a third selected group of said reed switches to said counter input during a third predetermined number of operating cycles of said first means;

said first, second and third groups each including a different quantity of reed switches.

References Cited

UNITED STATES PATENTS

| | | | |
|---|---|---|---|
| 3,266,018 | 8/1966 | Higgins | 340—151 |
| 2,922,994 | 1/1960 | Kennedy. | |

MAYNARD R. WILBUR, Primary Examiner

JOSEPH M. THESZ, Assistant Examiner